Patented Feb. 6, 1923.

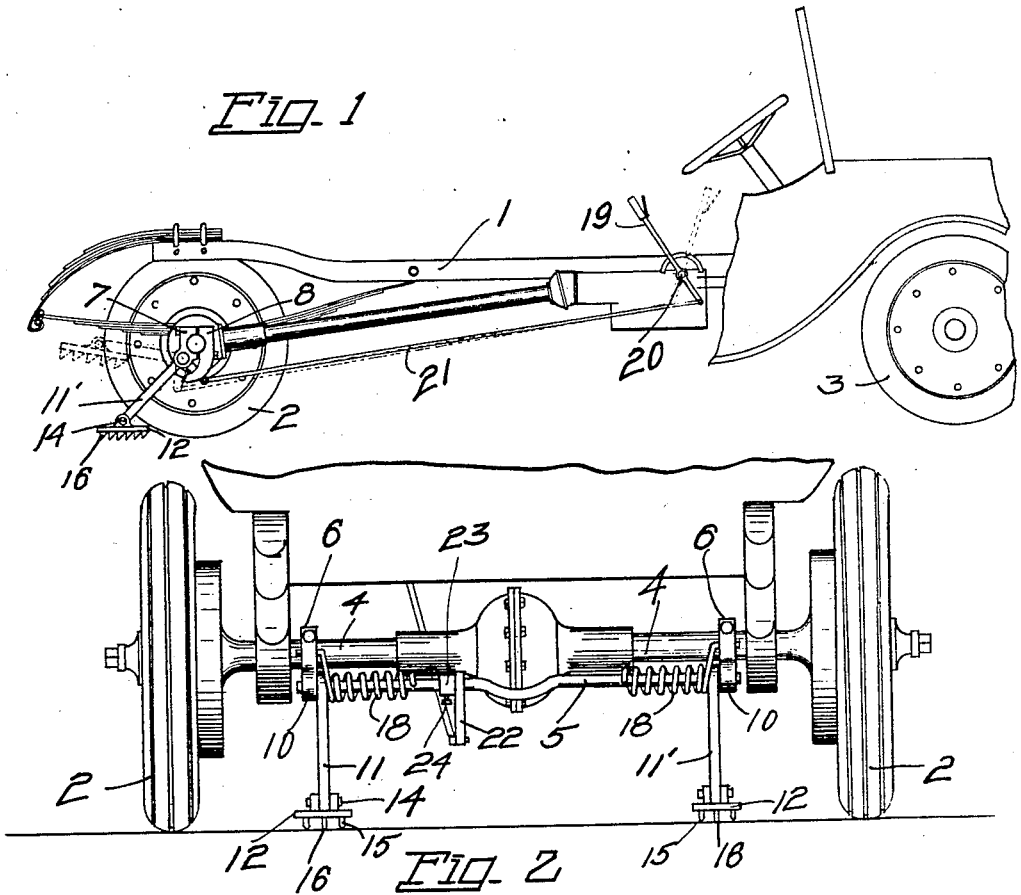
Fig. 1
Fig. 2
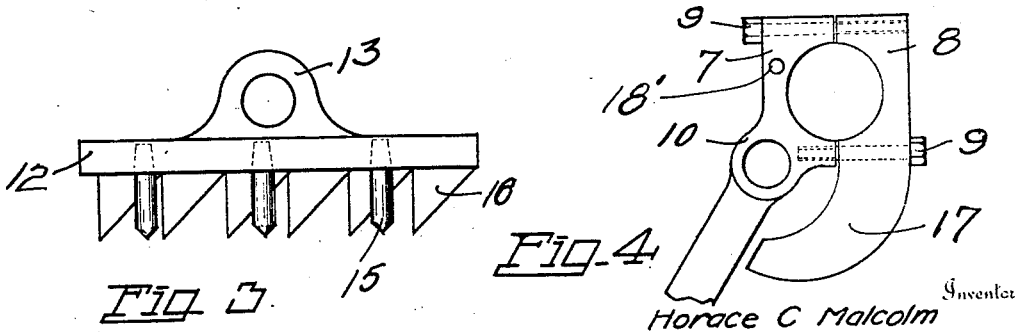
Fig. 3
Fig. 4
Inventor
Horace C Malcolm

1,444,1

UNITED STATES PATENT OFFICE.

HORACE C. MALCOLM, OF SPOKANE, WASHINGTON, ASSIGNOR OF ONE-HALF ʔ ARTHUR B. COLINGHAM, OF SPOKANE, WASHINGTON.

AUTOMOBILE BRAKE.

Application filed August 24, 1921. Serial No. 494,807.

*To all whom it may concern:*

Be it known that I, HORACE C. MALCOLM, a citizen of the United States, residing at Spokane, in Spokane County and State of Washington, have invented certain new and useful Improvements in Automobile Brakes, of which the following is a specification.

My present invention relates to improvements in automobile brakes of that type involving the use of ground engaging members to hold, retard, and prevent skidding of the vehicle, to which the brake mechanism is attached. The primary object of the invention is the provision of means involving mechanism that is comparatively simple in construction and arrangement, and facile in operation, and inasmuch as the device embodies a practical minimum number of parts in its construction, the cost of production is comparatively inexpensive.

The invention consists in certain novel combinations and arrangements of parts as will be hereinafter more fully described and claimed. In the accompanying drawings I have illustrated one complete example of the physical embodiment of my invention in which the parts are combined and arranged according to the best mode I have thus far devised for the practical application of the principles of my invention.

Figure 1 is a view in side elevation of so much of an automobile as is necessary to illustrate the application of my invention thereto, and to show the relation of parts.

Figure 2 is a view in elevation at the rear of the automobile having the device of my invention utilized therewith, and showing the ground engaging members in operative position.

Figure 3 is a side view, enlarged, of one of the pair of brake shoes or ground engaging members.

Figure 4 is an enlarged view, in side elevation, of one of the brake shaft hangers, for attachment to the rear axle of the automobile.

In the preferred form of the invention as illustrated in the drawings I have illustrated a standard type of automobile and designated the frame as 1, the rear and front wheels as 2 and 3 respectively, and the rear axle as 4, to which latter member the mechanism of my invention is attached.

The subject matter of the invention involving the actuating and operating mechanisms may be attached to existing a mobiles with facility, or may be affixe( the automobiles as they are manufactu in the factory. In either event I utili; pair of shaft hangers 6, 6, one near eacl the rear springs of the vehicle and affi to the rear axle 4. These hangers comp complementary clamps or clamp block and 8 having curved faces to form a so( around the axle 4, and bolts 9, 9 are utili to clamp and rigidly hold the hangers the axle as shown. These hangers are signed to support the brake shaft 5 wl has its ends journaled in bearing bosses of the hangers, and is disposed parallel v and at the rear of the axle, in positior that it may be rocked or oscillated.

Near the respective ends of the br shaft are pivoted lever arms 11 and 11' complementary construction, and at the ɪ ends of the lever arms are carried br shoes 12, preferably made up of rectangu metallic plates, each fashioned with a ɪ forated lug 13 by means of which the s is pivoted to its lever arm on the pin bolt 14.

The brake shoes are thus pivoted to lever arms with a freedom of movement order that the ground engaging members and 16 on the under faces of the shoes n readily engage the surface of the grou regardless of the contour thereof.

Each of the clamp blocks 8 of the sh hangers, is fashioned with a downwar projecting horn, or curved lug 17 loca just in front of the lever arm and in p( tion to form an abutment therefor to prev excessive forward swing of the lever aɪ

By means of springs 18, 18, one for eɛ lever arm, said arms are urged to swi downwardly to engage the brake shoe w the ground, and preferably these springs ɪ coiled about the shaft 5 with one end tached thereto, and the other end of eɛ spring is attached to a lever arm, for swiɪ ing said arm to operative position.

An operating lever 19 is employed swing the brake shoes into inoperative po tion, as in dotted lines Figure 1, and to ass in applying the brakes. This lever pivoted at 20 to a suitable part of the au mobile frame and is connected by rod 21 a crank arm 22 having a sleeve 23 affixed the shaft 5 by a set bolt 24. Thus, wh the lever 19 is pushed forward to dott position in Figure 1 the brake shaft 5 is rocked in its bearings 10, and through the cushion or resilient connection of the springs between the shaft and lever arms, the lever arms and brake shoes are swung to dotted position of Figure 1.

Should the automobile motor or engine stop for any reason, as the vehicle is traveling up hill, the lever 19 may be pulled back to full line position in Figure 1, thus reversing the rocking or oscillating motion of the shaft 5, and through the springs, which have been held under tension, the brake arms and shoes are swung downwardly to the rear as in full lines Figures 1 and 2, and the spikes 15 and spurs 16 of the pivoted shoes are caused to engage the ground and effectually prevent backward movement of the vehicle. When the vehicle is again ready to proceed, the brakes may be released, and the springs and lever 19 are utilized to swing the shoes to inoperative position as in dotted lines, Figure 1.

Having thus fully described my invention, what I claim as new and desire to secure by Letters Patent is—

1. The combination with an automobile axle and hangers affixed thereto including bearing bosses, of a rock shaft in said bosses, lever arms on said shaft and a spring for each arm connecting an arm and said shaft, pivoted brake shoes on the free ends of said arms and ground engaging members on said shoes, and lever mechanism for normally retaining said shoes in uplifted position.

2. The combination with an axle of clamp members affixed thereto including bearing bosses, a rock shaft supported in said bosses, a crank arm on the shaft and an operating lever connected thereto, lever arms pivoted on said shaft, a pair of springs coiled about said shaft each having one end attached to the shaft and its other end attached to a lever arm, and ground engaging members pivoted on the free ends of said lever arms.

In testimony whereof I affix my signature.

HORACE C. MALCOLM.